June 27, 1939.　　　　　J. L. OSGOOD　　　　　2,164,076
MEANS FOR PREVENTING THEFT OF AUTOMOBILES
Filed April 6, 1938　　　3 Sheets-Sheet 1
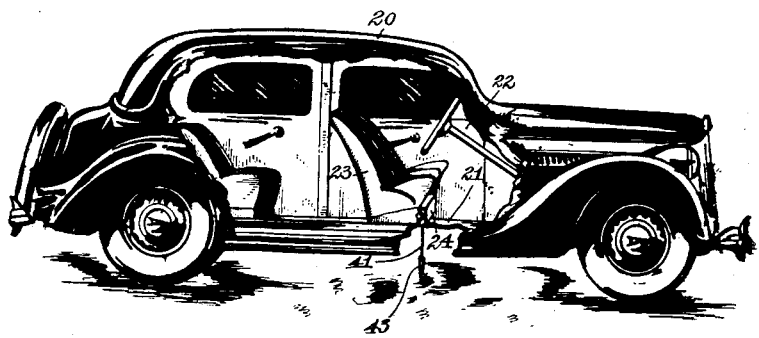
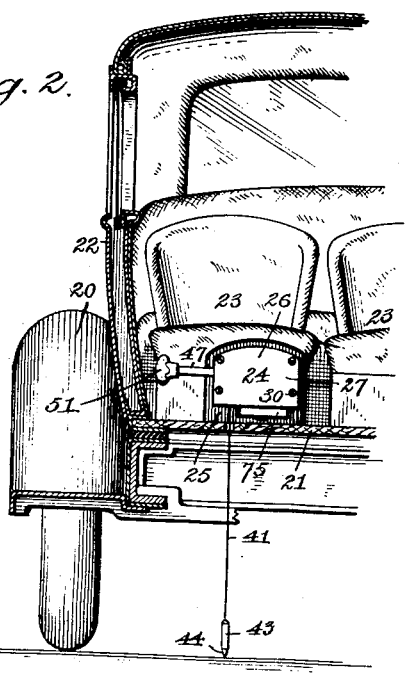
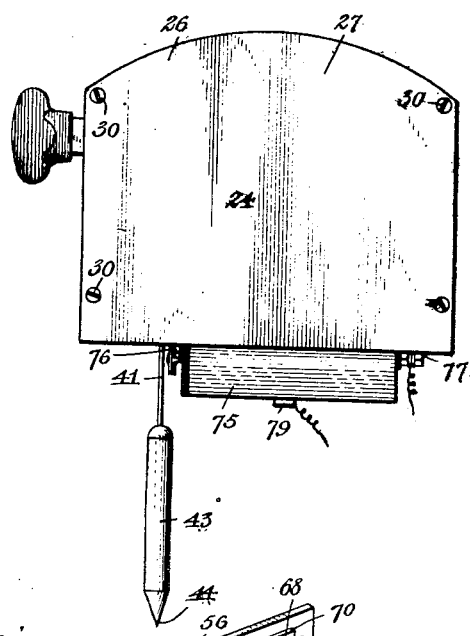
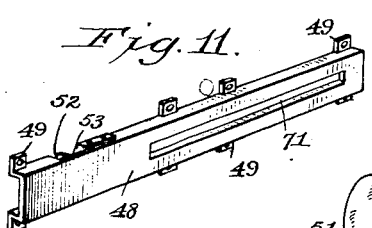
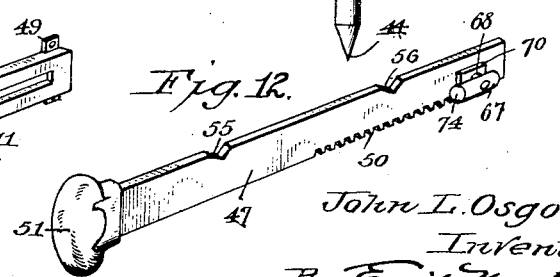

June 27, 1939.   J. L. OSGOOD   2,164,076
MEANS FOR PREVENTING THEFT OF AUTOMOBILES
Filed April 6, 1938   3 Sheets-Sheet 2
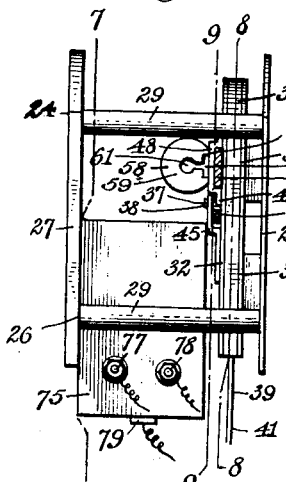
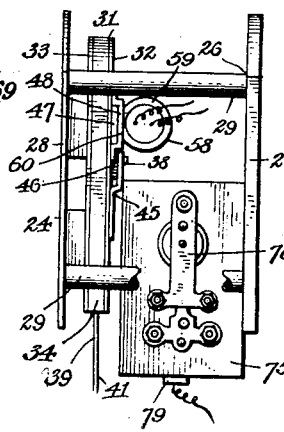
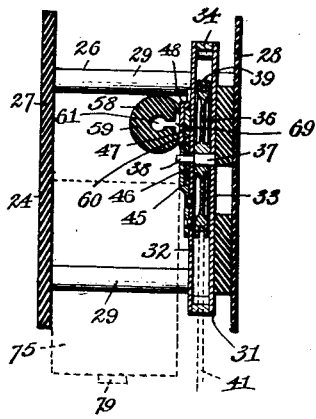
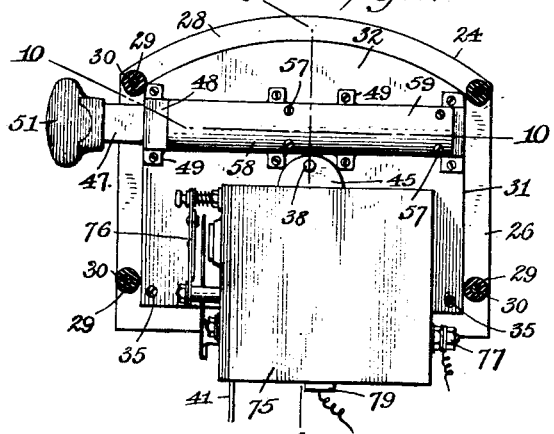
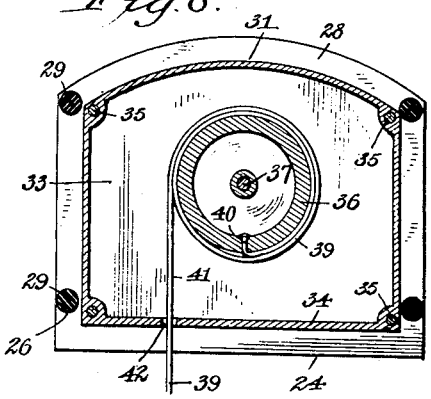
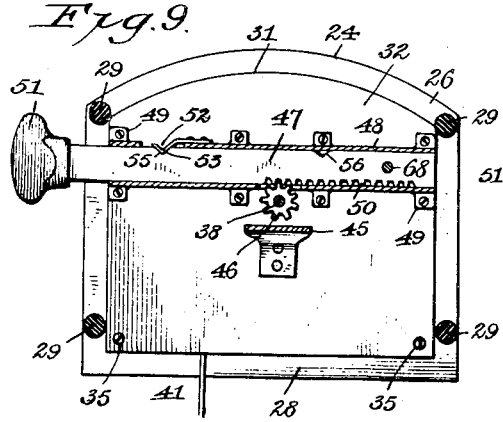
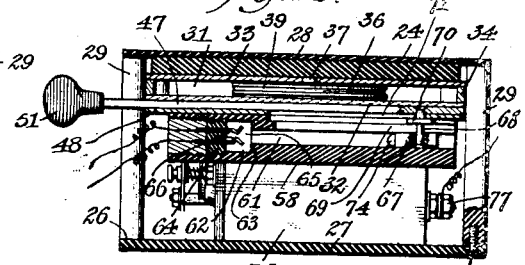
John L. Osgood, Inventor
By *Attorney*

June 27, 1939.　　　　J. L. OSGOOD　　　　2,164,076
MEANS FOR PREVENTING THEFT OF AUTOMOBILES
Filed April 6, 1938　　　3 Sheets-Sheet 3

John L. Osgood,
Inventor.
By Emil Kuhart
Attorney.

Patented June 27, 1939

2,164,076

UNITED STATES PATENT OFFICE 2,164,076

MEANS FOR PREVENTING THEFT OF AUTOMOBILES

John L. Osgood, Buffalo, N. Y.

Application April 6, 1938, Serial No. 200,557

6 Claims. (Cl. 177—314)

This invention relates to theft prevention means for automobiles, parts thereof, accessories thereto and contents thereof.

This invention has for its primary object the use of electrical means on an automobile embodying a grounded broken circuit which will be fully established when a person comes in contact with the automobile, so as to guard against the theft of the automobile or the theft of any part thereof or accessories thereto, including contents of the automobile, or contents of any of the parts thereof, such as gasoline within the gasoline tank, and the like.

Another object of my invention is to provide an electro-mechanical device in the form of a compact unit capable of being applied to any automobile and adapted to be changed from automobile to automobile as the owner acquires new automobiles from year to year, or at other intervals.

Another object is to provide means including a broken grounded electric circuit which will be completed by a person coming in contact with the automobile and serving as connecting means for said broken circuit, the circuit so established causing such person to be subjected to a high-voltage low-capacity current of comparatively high frequency, thereby severely shocking the person without possibility of injury; such action serving as a check against any attempt or further attempt to do some act contrary to law or equity.

Another object of my invention is to provide means to sufficiently shock any individual coming in contact with the automobile so as to cause him to recede and refrain from any further attempts to contact the automobile, such means utilizing the ordinary current from a battery with which the automobile is equipped and serving to build up such current or power to a high voltage, yet one non-injurious to the person coming in contact with the automobile.

A further object of my invention is the provision of new and novel theft prevention means having as its source of power the battery of usual voltage with which an automobile is equipped and embodying an induction-coil or other electrical device for stepping-up such power, preferably to approximately thirty thousand free voltage; such increased voltage being obtained upon actuation of a suitable control-device installed at any convenient point within the automobile and adapted to be actuated upon leaving the automobile, which latter is preferably locked against ingress so that the control-device is rendered inaccessible, and opening of at least one of the doors will be necessary before access can be gained thereto; the owner or rightful user of the automobile being furnished with an insulated key to lock and unlock the door of the automobile, or at least to unlock the door when the automobile is equipped with means for automatically locking the door when closing the same; it being the intention that the owner or rightful user of the automobile shall be equipped with insulation means to be placed over the handle of the door so as to unlatch the door-catch without being subjected to shock of the high-voltage current provided.

With these and other objects in view to appear hereinafter, my invention consists in the employment of a comparatively high-voltage grounded broken circuit to be completed by a person coming in contact with the automobile and causing completion of the circuit and being thereby subjected to an electric shock of considerable intensity.

The invention also consists in the novel features of construction and in the arrangement and combination of parts to be hereinafter described and more particularly pointed out in the subjoined claims.

In the drawings,

Fig. 1 is a perspective view of an automobile showing a portion of the side, running board and floor broken away, and the control-device of my invention situated within the automobile with a part thereof extending through the floor and in contact with the ground or road surface.

Fig. 2 is a transverse section through a portion of an automobile, showing the control-device of my improved theft-prevention means secured to one of the front seats of the automobile.

Fig. 3 is a front elevation of the control-device.

Fig. 4 is a view of one end of the control-device.

Fig. 5 is a view of the other end of the control-device.

Fig. 6 is a transverse section taken on line 6—6, Fig. 7.

Fig. 7 is a longitudinal section taken on line 7—7, Fig. 4.

Fig. 8 is a longitudinal section taken on line 8—8, Fig. 4.

Fig. 9 is a longitudinal section taken on line 9—9, Fig. 4.

Fig. 10 is a horizontal section taken on line 10—10, Fig. 7.

Fig. 11 is a detached perspective view of the channel-shaped housing in which the combined gear rack and switch bar or prime actuator of the control-device is slidably held.

Fig. 12 is a detached perspective view of the combined gear rack and switch bar or prime actuator of the control-device.

Figure 13:
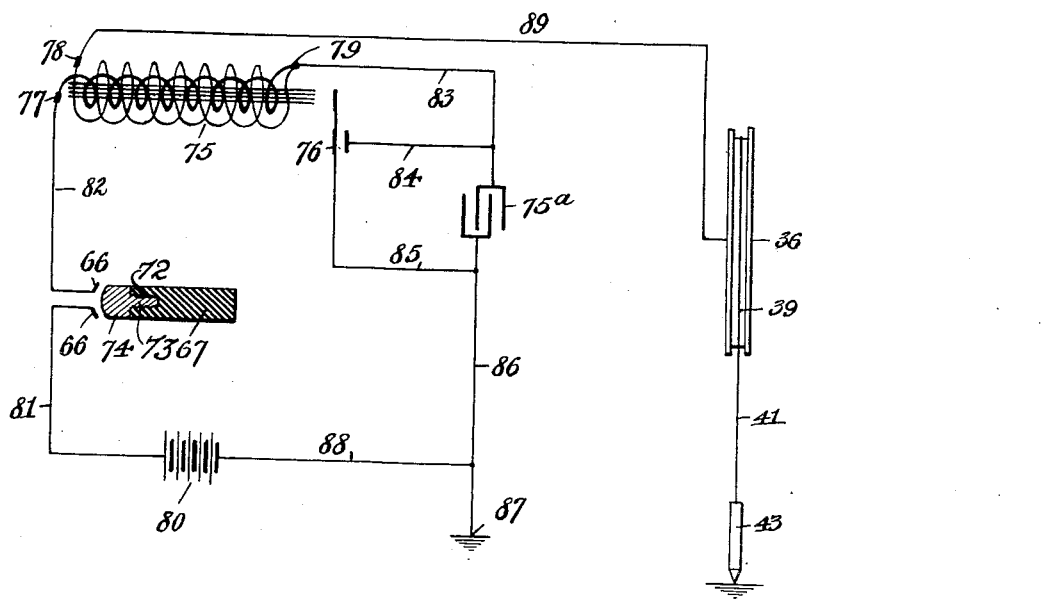
Fig. 13 is a diagrammatic view showing the various parts included in the electric circuit and the connections between such parts, in what I now consider the preferred arrangement.

In the drawings, 20 designates the body of the automobile which is shown broken away in Fig. 1 to disclose the interior of the automobile, and in which 21 designates the floor and 22 one of the fore-doors by means of which access is had to the front portion of the automobile body in which the front seats 23 are located.

24 designates the control-device of the theft-prevention means, and while this may be arranged at any desired point within the automobile body, I preferably secure it to one of the front seats 23 so that by means of seat covers, or otherwise, it may be concealed, and for this purpose the seat may be recessed at the front, as at 25. In this position it is also easily accessible to manipulate the same when the right-hand fore-door of the automobile is opened.

This control-device comprises a framework or support 26 which may, if desired, be in the form of a casing or housing, but I have in most figures of the drawings illustrated it in the form of a skeleton frame, and this can be enclosed within a suitable casing if desired, such being shown in Fig. 1. It will therefore be understood that the particular form of support is immaterial and it is merely a matter of choice as to whether or not this support shall be in the form of an enclosure, placed within an enclosure, or left exposed in skeleton form, or otherwise.

In the particular instance illustrated, the frame comprises a front plate 27 preferably shaped as shown in Fig. 3, and constructed of insulation material, 28 designates a rear plate which may also be of insulation material. The plates 27 and 28 are connected together and maintained in definitely spaced relation by spacer bars 29 also formed of insulation material and having screws 30 passed through the plates 27 and 28 and threaded into the ends of said bars.

Fastened to the inner side of the rear plate 28 and spaced therefrom is a reel housing 31 which comprises two plates 32, 33 held spaced apart by an intervening frame 34, to opposite sides of which the plates 32 and 33 are fastened by means of screws 35. A reel 36 fastened to a shaft 37 in any suitable manner is enclosed in this housing, said shaft being journaled in the spaced-apart plates 32, 33 and projecting forwardly a distance beyond the outer face of the plate 32, as at 38, for a purpose to appear hereinafter. The frame 34 serves as the top, bottom, and end walls of said housing.

39 is a current-conducting tape or cord which has one end secured to the reel, as at 40, or otherwise, and is normally wound around said reel in a manner to provide a hanging or depending portion 41 which extends through an opening 42 in the bottom wall of the housing 31 and through an opening in the automobile floor. To the lower end of the hanging or depending portion of the tape or cord 39 a combined weight and ground-contact 43 is secured which is also constructed of current-conducting material and has a pointed lower end 44 designed to penetrate thin ice or other non-conducting or current-resisting material which may happen to cover the road or other surface upon which the automobile rests.

The reel 36 may be termed a combined wind-up and pay-out reel, and it has the tape or cord 39 secured thereto in a manner to carry current from the shaft 37 to the combined weight and ground-contact 43.

The projecting end 38 of the shaft 37 may be reduced in diameter and journaled in a bracket 45 secured to the front face of the plate 32 of the reel housing; and fastened on said shaft between the bracket 35 and said plate 32 is a pinion 46 which is in mesh with a combined gear-rack and switch-bar 47 slidable in a channel-shaped housing 48 which has projecting securing ears 49 at intervals along the length thereof for the purpose of fastening said channel-shaped housing to the front of the reel housing, as best shown in Fig. 9. The teeth 50 formed along the lower edge of the combined gear-rack and switch-bar are in mesh with the teeth of the pinion 46 and to one end of said gear-rack and switch-bar a handle 51 of rubber or other insulation material is secured in any suitable manner. Said gear-rack or switch-bar 47, which may be termed the prime actuator of the control-device, extends outwardly beyond one edge of the control-device so that it can be easily actuated by grasping the insulation handle 51.

The upper wall of the channel-shaped housing may be slotted, as shown at 52, Fig. 9, and arranged in the slot so located is a retainer spring 53 having one end fastened to said upper wall adjacent said slot and having its other end bent into substantially V-formation, as at 54, to enter either of two V-shaped notches 55, 56 formed in the upper edge of the gear-rack or switch-bar 47. This spring-and-notch construction is provided to retain the gear-rack and switch-bar or prime actuator in either of its two positions, in one of which it has caused the current-conducting tape or cord 39 to be paid out so as to bring the ground-contact 43 in engagement with the road surface, as shown in Fig. 1, and in the other of which it has caused said tape or cord to be wound up and the ground-contact 43 to be elevated and retained in such position, as for example shown in Fig. 3.

It may in some instances be desirable to omit one of the two V-shaped notches 55, namely that which holds the combined gear-rack and switch-bar 47 in extended position. This omission would be an advantage where the ground or road surface is uneven and has a depression formed therein at the point where the ground-contact 43 engages the road surface, because in such cases the ground-contact will have to assume a contact position lower than normal, and if checked by the retainer spring 53 entering the notch 56, grounding of the broken circuit could not take place.

Fastened to the outer side of the channel-shaped housing 48, by means of screws 57, is a switch or circuit-closer 58 which includes a housing 59 formed of insulation material and which housing may be parti-cylindrical in cross section to provide a flat face 60 lying in contact with the channel-shaped housing 48, but may be given any other desired shape. This switch or circuit-closer has an axial bore 61 formed therethrough which is enlarged at one end, as at 62, to form a shoulder 63, the enlarged portion of said bore being threaded from its outer end inwardly and having a nut 64 formed of hard rubber or other high resistance material threaded thereinto so as to be positioned a distance from the outer end of said enlarged bore and also a distance from the shoulder 63 to form a spring-contact chamber 65 between said shoulder and said nut.

The nut 64 carries spaced-apart spring contact-fingers 66 which are disposed within said chamber 65. Slidably arranged within the smaller portion of said bore is a rod 67, also constructed of hard rubber or other high resistance material and having a laterally extending arm 68 secured thereto or formed thereon which projects out through a T-shaped slot 69 opening to the flat side of the switch housing 48 and extending along a considerable length of the bore 61 in said housing.

The arm 68 has a flat extending portion 70 which is guided in the head portion of said T-shaped slot 69 and serves to prevent binding of the rod 67 in the switch-housing 48. Said arm extends through a slot 71 formed in the channel-shaped housing 48 and is secured to the combined gear-rack and switch-bar 47; thus causing the rod 67 to move with the combined gear-rack and switch-bar 47.

The rod 67 is provided at that end closest to the spring contact-fingers 66 with a threaded bore 72 into which the threaded shank 73 of a contact 74 is engaged, said contact being designed for engagement with the spring contact-fingers 66 when the combined gear-rack and switch-bar 47 is drawn outwardly; contact 74 entering between said spring contact-fingers and closing the circuit, except so much as must be closed by an individual coming in contact with the automobile. By constructing the switch or circuit-closer in the form described, the high voltage is prevented from coming in contact with low-voltage parts of the circuit; the high voltage referred to being established by means of an induction-coil 75 or like electrical device serving to supply a source of high voltage or power to the various parts of the automobile by utilizing the ordinary six-volt storage battery as a source of power.

The induction-coil is of a type well known to those skilled in the art, and it has a condenser 75ª associated therewith, as shown in diagrammatic Fig. 13 of the drawings, so as to assure high voltage current of low capacity and comparatively high frequencies.

It will also be apparent to those skilled in the are that where automobiles are stored and battery power is not available, alternating current may be used; and where such only is available as a source of current for my improved theft-prevention means, a transformer would be installed between the source of current and the control-device of my invention.

In the case of direct current only being available, it will be apparent that my device could be placed in operative condition by the addition of a resistance in series with the current-supply line.

The induction-coil has the usual vibrator 76, the primary terminals 77, 78, and a high-voltage terminal 79. Leading from the battery, designated 80 in Fig. 13, is a wire 81 which is connected with one of the two contact fingers 66 of the switch or circuit-closer. From the other contact finger 66 a wire 82 is led to the primary terminal 77. From the high-voltage terminal 79 a wire 83 is led to the condenser 75ª; from the vibrator 76 a wire 84 to lead to wire 83; and a wire 85 to a wire 86 connected to the condenser 75ª and to the frame or other current-conducting portion of the automobile, as at 87. From the battery 80 a wire 88 is led to the wire 86. A wire 89 connects the primary terminal 78 of the induction coil with the cord reel 36, and this cord reel has the tape or cord 39 wound around the same which when paid out brings the ground-contact 43 in engagement with the pavement or other surface on which the automobile rests.

It will be apparent, therefore, that when the combined gear-rack and switch-bar 47 is drawn outward, it will cause the contact 74 to engage the contact fingers 66, thereby causing a connection which establishes a broken ground circuit requiring only connection between the grounding and some part of the automobile to establish a complete circuit; such circuit being established by a person coming in contact with any portion of the automobile while standing upon the ground and thereby subjecting the person to high voltage current which will pass through and shock the individual serving as a means to connect the otherwise broken electric circuit established by the closing of the switch or circuit-closer 58.

Figure 14:
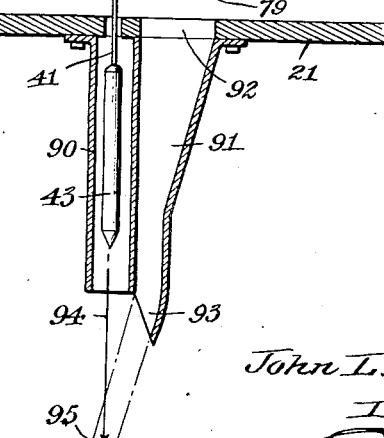
Fig. 14 is a sectional elevation wherein the control-device is shown in front elevation and a chute or conduit is shown in section depending from the floor of the automobile to enable brine or some other ice solvent to be delivered therethrough for melting ice at the region where the ground-contact of the device is to engage the road surface.

I have ascertained that when an automobile is stopped over an icy pavement, difficulty is sometimes encountered in having the ground-contact 43 make proper contact with the ground, due to the fact that it does not, in some instances, fully penetrate the icy surface of the pavement; and since ice seems to be somewhat of a non-conductor of current, I have provided means to deposit an ice-solvent, such as brine or the like, over the area or around the point at which the ground contact is designed to engage the pavement. For this purpose I provide a depending tube 90 which I secure at its upper end to the under side of the floor 21 of the automobile, as shown in Fig. 14, and in which the ground-contact 43 is normally retained. In this figure I have shown the ground-contact somewhat longer than shown in Fig. 3 so as to add weight thereto, and thus aid in penetrating the icy surface when the ground-contact is lowered.

Adjoining the tube 90 is a chute or conduit 91 which may be cast in piece with the tube 90 and which is preferably enlarged at its upper end to the form of a funnel and opens to the interior of the automobile through an opening 92 formed in the floor 21. The lower end of this chute is laterally deflected toward the axis, or more particularly the extended axis of the ground-contact 43 and the tube 90, as at 93; and in Fig. 14 the line 94 designates the line of travel of the pointed end of the ground-contact, which will engage the road surface or the ice or any other covering or coating thereon at the point designated 95. It is intended that brine or any other ice-solvent may be poured through the chute or conduit 91 from the interior of the automobile, and by deflecting the lower portion of this chute or conduit as described, the solvent will be deposited over an area of which the point 95 will be the center. It will be clear therefore that the ice accumulated on a road surface may be melted over a small area preparatory to lowering the ground-contact, so that the pointed end of the latter will engage the so uncovered road surface at the center of such area; or, said ground-contact may be lowered with a view of causing the weight of the same to partly penetrate the ice, after which the ice-solvent may be poured through the chute 91, and as the ice becomes melted around the end of the ground-contact the latter will lower automatically under its own weight and cause a good contact to be made with the ground after the lapse of a few minutes.

In order to guard against the owner or rightful user of the automobile being shocked as he prepares to enter the car—the circuit being closed except for the grounding through a person touching the automobile—he is provided with a key having an insulation handle, and furthermore he will be in possession of a comparatively thick insulation sheath or cover designed to fit the handle by means of which the door-latch is actuated, such sheath or cover being designed to be quickly applied to and removed from the handle.

Where in the specification and claims reference is made to the ground, it is intended to mean any support or surface on which the automobile rests.

By the term "body" as applied to the automobile, I include all exposed portions of the automobile in electrical conductivity with any or all doors of the automobile, and also all such parts through which current can be passed.

It will be apparent from the foregoing that anyone attempting to unlock the automobile with an ordinary duplicate key or any other object possessing current-conducting qualities, would be subjected to a severe electrical shock, since the current would pass from the key or other object through his body to the ground, and from the ground upwardly through the ground-contact 43 and the various wire-connected parts of the device. This would also be true of anyone attempting to lift the hood of the automobile, or attempting to open the door, if left unlocked. The same results would occur were an attempt made to unscrew the cap of the gasoline tank with a view of siphoning gasoline therefrom or if anyone touched any other exposed portion of the automobile possessing the quality of conducting electric current.

It will further be apparent that various changes in construction, substitution of parts, changes in wiring, and arrangement of parts may be made without departing from the spirit of this invention as set out in the accompanying claims, or sacrificing any of the advantages thereof.

Having thus described my invention, what I claim is:

1. Theft-prevention means for automobiles, comprising as a device attachable to and removable from the automobile as a unit, an electric circuit having a source of current of low voltage and including means for transforming said current into high voltage low capacity current, said circuit including a manually actuatable circuit closer adapted to be closed upon leaving the automobile, a ground contact, means to move said ground contact into and out of contact with the surface on which the automobile rests, and connection with a portion of the automobile maintained in electrical connection with other portions of the automobile formed of current-conducting materials, including equipment secured to the automobile or mounted thereon.

2. Theft-prevention means for automobiles comprising an electro-mechanical device removable from and attachable to any automobile as a unit, said device comprising an electric circuit having a source of current of low voltage including means for transforming the low voltage current to high voltage current, a manually actuatable circuit closer in said circuit adapted to be closed upon leaving the automobile, electrical connection between the high voltage side of said current-transforming means and a current-conducting portion of the automobile, a ground contact, and means to move said ground contact into and out of contact with the ground on which the automobile rests, and said means having electrical connection with said current-transforming means, said circuit being completed through said ground-contact when engaging the ground and a person coming in contact with portions of the automobile, including exposed equipment or accessories secured thereto or mounted thereon.

3. Theft-prevention means for automobiles, comprising an electro-mechanical device removable from and attachable to any automobile as a unit, an electric circuit including a manually actuatable circuit-closer adapted to be closed upon leaving the automobile and having a source of low voltage current, transformer means to transform said current into high voltage current, a ground-contact, means to cause engagement of said ground-contact with the ground when closing said circuit-closer, said circuit including electrical connection between the high voltage side of said transformer-means and a current-conducting portion of the automobile electrically connected with all other exposed current-conducting portions of the automobile and adapted to be completed by grounding the current through the body of a person coming in contact with the automobile.

4. Theft-prevention means for automobiles, comprising an electric circuit having a source of current of low voltage and including an induction coil, a condenser associated with said induction coil, a manually actuatable circuit closer in said electric circuit, a wire connecting the high voltage side of said induction coil to a portion of the automobile and having the condenser therein, wires connecting the vibrator of said induction coil with the wires connected to said condenser, and a wire leading from said induction coil to the ground, said last-mentioned wire having means electrically connected therewith movable into and out of contact with the ground.

5. Theft-prevention means for automobiles, comprising an electric circuit having a source of current of low voltage and including means for transforming said current into high voltage current, said means including an induction coil and a condenser, current-conducting wires connecting said coil with said condenser and a current-conducting portion of the automobile, a manually-actuated device having a reel rotatably mounted, a ground-contact having a current-conducting flexible element wound around said reel, a circuit closer for opening and closing said electric circuit including a movable element, means between said movable element and said reel to rotate the latter upon movement of said movable element, and a current-conducting wire connecting said coil with said ground-contact.

6. Theft-prevention means for automobiles, comprising an electric circuit having a source of current of low voltage and including current-transforming means for transforming said current into high voltage current, circuit wires connected to said current transforming means and grounded to a portion of the automobile, said circuit wires having also electrical connection with a manually-actuated device comprising a reel, a shaft to which said reel is secured, a ground-contact connected with said reel by a current-conducting flexible element wound around said reel, a circuit closer for opening and closing said circuit including a movable element, a rack bar connected to said movable element and serving as the prime actuator of said device, and a pinion on said shaft in mesh with said rack bar.

JOHN L. OSGOOD.